United States Patent
Li et al.

(10) Patent No.: US 10,583,418 B2
(45) Date of Patent: Mar. 10, 2020

(54) METHODS FOR PREPARING LICA-LSX MOLECULAR SIEVES WITH MIXED CATIONS AND APPLICATIONS THEREOF

(71) Applicant: LUOYANG JALON MICRO-NANO NEW MATERIALS CO., LTD, Luoyang, Henan (CN)

(72) Inventors: Jianbo Li, Henan (CN); Yingshu Liu, Henan (CN); Xiong Yang, Henan (CN); Yanxia Guo, Henan (CN)

(73) Assignee: LUOYANG JALON MICRO-NANO NEW MATERIALS CO., LTD, Luoyang (CN)

( * ) Notice: Subject to any disclaimer, the term of this patent is extended or adjusted under 35 U.S.C. 154(b) by 232 days.

(21) Appl. No.: 15/887,973

(22) Filed: Feb. 2, 2018

(65) Prior Publication Data
US 2019/0070584 A1  Mar. 7, 2019

(30) Foreign Application Priority Data

Sep. 6, 2017  (CN) .......................... 2017 1 0793404

(51) Int. Cl.
*B01J 20/18* (2006.01)
*B01D 53/04* (2006.01)
(Continued)

(52) U.S. Cl.
CPC .............. *B01J 20/18* (2013.01); *B01D 53/02* (2013.01); *B01D 53/047* (2013.01);
(Continued)

(58) Field of Classification Search
CPC ...... B01D 53/02; B01D 53/04; B01D 53/047; B01D 53/0476; B01D 2253/108;
(Continued)

(56) References Cited

U.S. PATENT DOCUMENTS

| | | | | |
|---|---|---|---|---|
| 6,036,939 A | * | 3/2000 | Funakoshi | ............. B01D 53/02 423/710 |
| 6,083,301 A | * | 7/2000 | Gary | ..................... B01D 53/02 95/130 |

(Continued)

*Primary Examiner* — Frank M Lawrence, Jr.
(74) *Attorney, Agent, or Firm* — Wayne & Ken, LLC; Tony Hom (57) ABSTRACT

The present invention relates to a method for preparing LiCa-LSX molecular sieves with mixed cations and applications thereof. The method comprises the following steps; preparing CaLSX molecular sieves; replacing all $Na^+$ in NaLSX molecular sieves with $Ca^{2+}$ by multiple times of exchange with a solution containing $Ca^{2+}$; changing CaLSX molecular sieves to LiCa-LSX molecular sieves by exchange with $Li^+$, wherein a solution containing $Li^+$ is used, and the exchanged sample is directly filtered in vacuum without washing and dried at normal temperature; and activating and pre-treating the sample to obtain LiCa-LSX molecular sieves with mixed cations. The LiCa-LSX molecular sieves can be used as selective adsorbents for $N_2$ and $O_2$ in oxygen production processes by PSA/VPSA. In the present invention, the loss of $Li^+$ caused by the replacement of $Li^+$ with $H^+$ because of hydrolysis is avoided, the cost is reduced and the treatment time is short.

5 Claims, 7 Drawing Sheets

(51) Int. Cl.
  *C01B 39/02* (2006.01)
  *C01B 33/26* (2006.01)
  *B01D 53/02* (2006.01)
  *B01D 53/047* (2006.01)
  *B01J 20/30* (2006.01)
  *C01B 39/22* (2006.01)

(52) U.S. Cl.
  CPC ........ *B01D 53/0476* (2013.01); *B01J 20/186* (2013.01); *B01J 20/3078* (2013.01); *B01J 20/3085* (2013.01); *C01B 33/2846* (2013.01); *C01B 39/026* (2013.01); *C01B 39/22* (2013.01); *B01D 2253/108* (2013.01); *B01D 2253/1085* (2013.01); *B01D 2256/10* (2013.01); *B01D 2256/12* (2013.01); *B01D 2257/102* (2013.01); *B01D 2257/104* (2013.01); *B01D 2258/06* (2013.01)

(58) Field of Classification Search
  CPC ........... B01D 2256/12; B01D 2257/102; B01J 20/18; B01J 20/183; B01J 20/186; B01J 20/3078; B01J 20/3085; C01B 33/2846; C01B 39/026; C01B 39/22
  USPC ................ 95/90, 96, 130, 902; 423/DIG. 21
  See application file for complete search history.

(56) References Cited

U.S. PATENT DOCUMENTS

| | | | | |
|---|---|---|---|---|
| 6,328,786 | B1* | 12/2001 | Labasque | B01D 53/0476 95/130 |
| 6,464,756 | B1* | 10/2002 | Plee | B01D 53/02 95/130 |
| 6,780,806 | B1* | 8/2004 | Yang | B01D 53/02 502/60 |
| 2013/0269524 | A1* | 10/2013 | Monereau | B01D 53/02 95/115 |

* cited by examiner

METHODS FOR PREPARING LICA-LSX MOLECULAR SIEVES WITH MIXED CATIONS AND APPLICATIONS THEREOF

TECHNICAL FIELD

The present invention relates to a method for preparing molecular sieves, and in particular to a method for preparing LiCa-LSX molecular sieves with mixed cations and applications thereof.

BACKGROUND OF THE PRESENT INVENTION

With the development of industrialization and economy, the application of high-purity oxygen and nitrogen is becoming increasingly wider, including fields such as oil refining, medical treatment, metal production, food processing and chemicals. As two main techniques for preparing high-purity oxygen and nitrogen, separation of air by cryogenic distillation and pressure swing adsorption (PSA) are already known. As adsorbent for oxygen production by means of separation of air by PSA, LiLSX sieves have the advantages of high nitrogen adsorption capacity and high nitrogen-oxygen separation coefficient. The key to preparation of LiLSX molecular sieves as adsorbent is the exchange of NaLSX molecular sieves with $Li^+$. Research indicates that there is almost no change in adsorption of molecular sieves for $N_2$ when the exchange degree of $Li^+$ is lower than 70%, and that the adsorption of molecular sieves for $N_2$ linearly increases only when the exchange degree of $Li^+$ increases to 100% from 70%. Therefore, a large amount of $Li^+$ is needed for the preparation of LiLSX molecular sieves. Furthermore, due to the rapid development of lithium-ion batteries and the gradual reduction of lithium reserves, the price of lithium has been rising since 2016. As a result, the production of LiLSX molecular sieves is quite costly.

Figure 1:
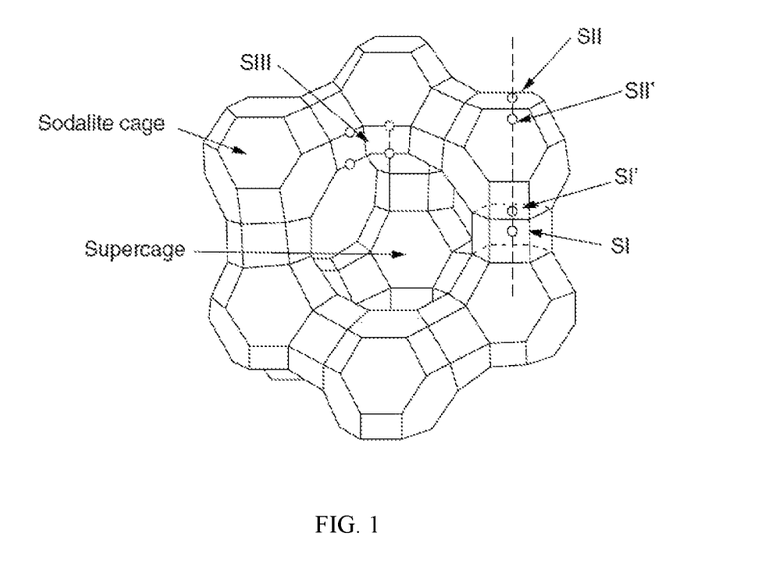
FIG. 1 shows cells of faujasite and distribution of sites.
Figure 2:
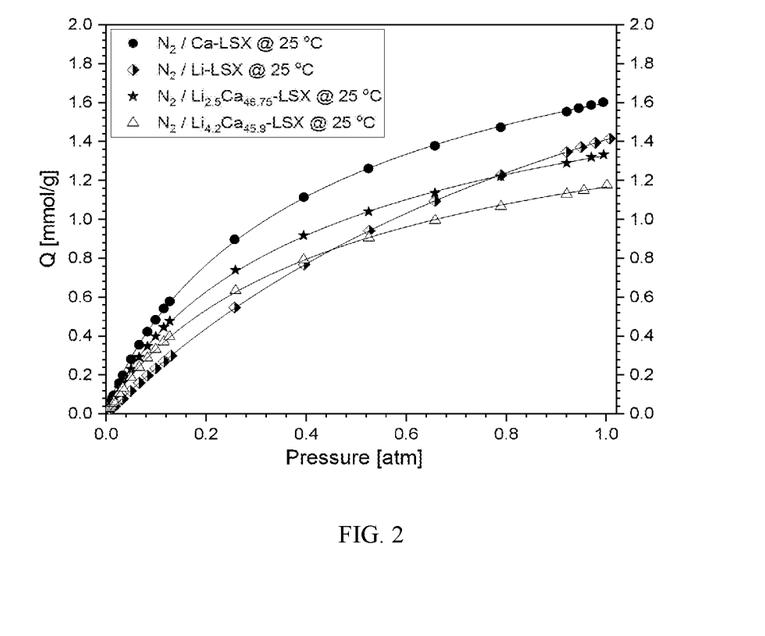
FIG. 2 shows adsorption isotherms of four samples for $N_2$ at 25° C. and 1 atm.
Figure 3:
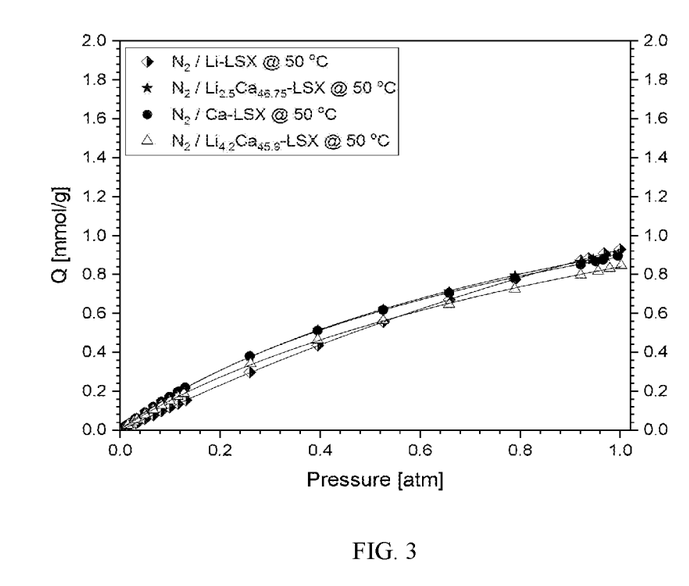
FIG. 3 shows adsorption isotherms of four samples for $N_2$ at 50° C./1 atm.
Figure 4:
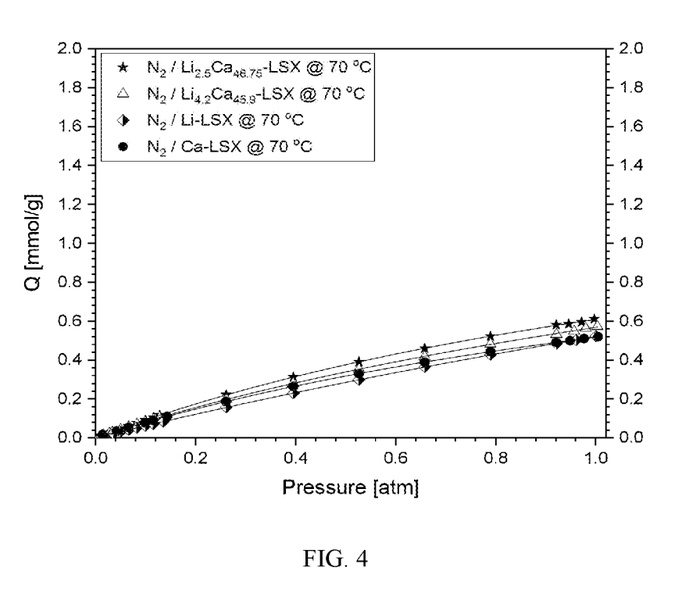
FIG. 4 shows adsorption isotherms of four samples for $N_2$ at 70° C./1 atm.
Figure 5:
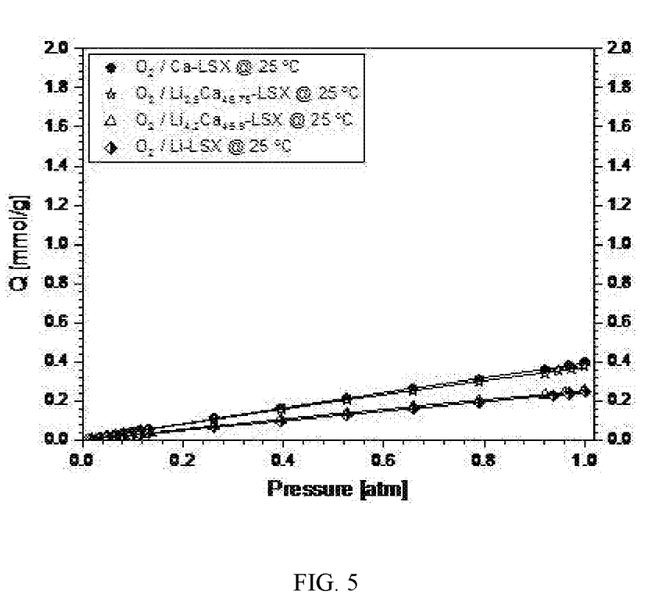
FIG. 5 shows adsorption isotherms of four samples for $O_2$ at 25° C. and 1 atm.
Figure 6:
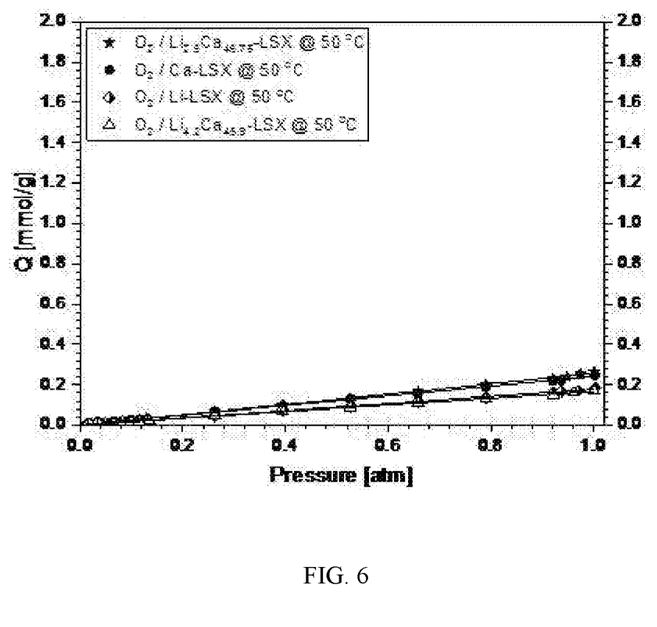
FIG. 6 shows adsorption isotherms of four samples for $O_2$ at 50° C. and 1 atm.
Figure 7:
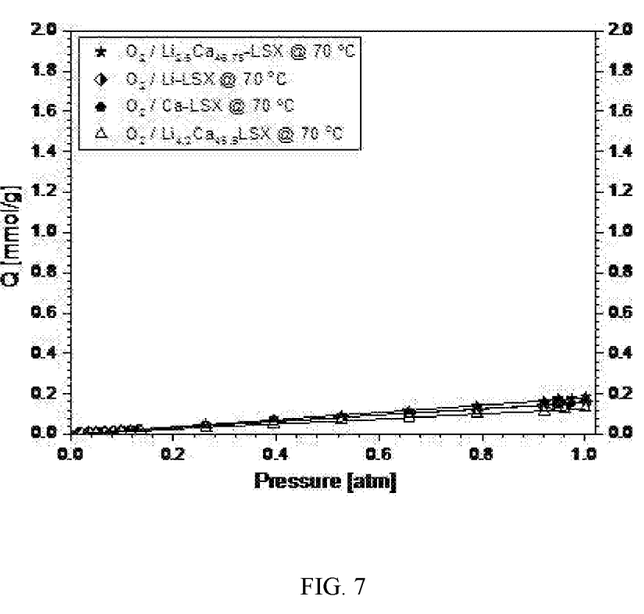
FIG. 7 shows adsorption isotherms of four samples for $O_2$ at 70° C. and 1 atm.

The separation of air by molecular sieves as adsorbent is based on the interaction between the electric field gradient of cations of molecular sieves and the quadrupole moment of $N_2$; and this interaction has a lot to do with the sites of cations of molecular sieves. FIG. 1 shows the sites of cations of faujasite. For LiX molecular sieves, only cations at the site III (SIII) can be interacted with $N_2$ ($O_2$), because $Li^+$ at site SII cannot be effectively utilized due to the electronic shield effect of oxygen and $Li^+$ of small size around the skeleton.

It is generally necessary to pre-heat molecular sieves for dehydration, before use. Usually, this process will last for at least 4 hours at 400° C. In this case, migration or diffusion of cations to their equilibrium sites will occur. For molecular sieves with mixed cations, it has been found by research that cations of low mass tend to migrate to lower sites (SI, SI', SII, SII'). For example, in CeNaCa—X molecular sieves with mixed cations, Na and Ca are at lower sites while Ce(III) cations are at some exosites. In NaSr—X zeolites with mixed canons, $Na^+$ is at site SI while $Sr^{2+}$ is at site SII. Such distribution of cations also exists in the skeleton of LiNa-LSX molecular sieves.

In the field of oxygen production by means of separation of air by PSA/VPSA, Li-LSX molecular sieves are highly favored. In such application fields, some other molecular sieves are also used, especially LSX molecular sieves with alkali metal cations. Chao et al. have found that A-type and X-type zeolites with mixed cations, including $Li^+$ (30% to 90%) and alkali metal cations (10% to 70%), for example. $Ca^{2+}$ and $Sr^{2+}$ have high adsorption for $N_2$. In these zeolites with mixed cations, at least 70 mol % of $Li^+$ is generally needed (the mole percentage of alkali metal ions is less than 30 mol %), and it is usually to exchange with $Li^+$ first and then with alkali metal ions. The present invention is aimed at synthesizing molecular sieve adsorbents which contain cheap or rich alkali metal cations as dominant elements and a small amount of $Li^+$ and can be used for gas separation.

SUMMARY OF THE PRESENT INVENTION

A technical problem to be solved by the present invention is to provide LiCa-LSX molecular sieves with mixed cations and applications thereof, which are suitable for industrial production, low in preparation cost, high in adsorption for $N_2$ and high in yield of oxygen by PSA/VPSA.

A technical problem to be further solved by the present invention is to provide a method for preparing LiCa-LSX molecular sieves which contain a low content of $Li^+$ in the skeleton and play a key adsorption role.

A technical problem to be further solved by the present invention is to reduce the content of $Li^+$ in the skeleton of molecular sieves as far as possible by mild exchange processes and enable all exchanged $Li^+$ to work.

A technical problem to be further sol by the present invention is to synthesize molecular sieve adsorbents which can be used in the field of oxygen production by means of separation of air by PSA/VPSA and have a high yield of oxygen.

To solve the technical problems, the present invention employs the following technical solutions.

A method for preparing LiCa-LSX molecular sieves with mixed cations, including the following steps.

Step 1 of preparing CaLSX molecular sieves;

during the preparation of CaLSX molecular sieves, replacing all $Na^+$ in NaLSX molecular sieves with $Ca^{2+}$ by multiple times of exchange with a solution containing $Ca^{2+}$ kept at room temperature, washing to remove $Ca^{2+}$ and $Cl^-$ adhered on the surface, and drying the filter cake obtained after washing to obtain CaLSX molecular sieves.

Specifically, the solution containing $Ca^{2+}$ is a common salt solution containing $Ca^{2+}$, preferably $CaCl_2$ solution; the exchange is performed for multiple times with the solution containing $Ca^{2+}$, preferably six times, and each exchange lasts for no less than 6 hours, and, preferably, the solution obtained by the previous times of exchange is used in the next exchange with $Ca^{2+}$ to obtain CaLSX.

More specifically, the concentration of $Ca^{2+}$ in the solution containing $Ca^{2+}$ is 1.0 M.

Step 2 of changing CaLSX molecular sieves to LiCa-LSX molecular sieves by exchange with $Li^+$ with the mole percentage of $Li^+$ in the resulting LiCa-LSX molecular sieves within a range from 2% to 5%, wherein:

during the exchange with $Li^+$ to produce CaLi-LSX molecular sieves, a solution containing $Li^+$ is used; the CaLSX molecular sieves are added in the solution containing $Li^+$ in such an amount that the amount of starting material of $Li^+$ is 0.15-0.3 times of that of $Ca^{2+}$ contained in CaLSX raw powder; the exchange lasts for 0.5-2 hours, preferably 1 hour, at room temperature: the exchanged sample is directly filtered in vacuum without washing, and dried at normal temperature; and, by controlling the addition amount of the solution containing $Li^+$, the mole percentage content of $Li^+$ in the prepared LiCa-LSX molecular sieves with mixed cations is 2% to 5%.

Here, the mole percentage of $Li^+$ is the percentage of the content of $Li^+$ in the amount of the dry raw powder of the molecular sieves with mixed cations added during ICP detection.

The solution containing $Li^+$ is a common salt solution containing $Li^+$, preferably LiCl solution.

More specifically, the concentration of $Li^+$ in the solution containing $Li^+$ is 1.0 M.

Step 3 of activating and pre-treating the sample: heating, at a rate of 5-15° C./min, the product which has been dried at normal temperature to a maximum temperature of 330-350° C., degassing for 0.5-3 hours, and naturally cooling to room temperature at the end of degassing, to obtain LiCa-LSX molecular sieves with mixed cations.

The method for preparing LiCa-LSX molecular sieves with mixed cations further includes a step 4 of performing isotherm tests.

In the method for preparing LiCa-LSX molecular sieves with mixed cations, the NaLSX molecular sieves refer to raw powder of molecular sieves having a $SiO_2/Al_2O_3$ ratio of 2.0.

Applications of LiCa-LSX molecular sieves with mixed cations are provided, wherein the LiCa-LSX molecular sieves are used as selective adsorbents for $N_2$ and $O_2$ in oxygen production processes by PSA/VPSA.

These technical solutions including improved technical solutions and further improved technical solutions can be combined or used together to achieve better technical effects.

In the method for preparing LiCa-LSX molecular sieves with mixed cations, the exchange degree of $Li^+$ can be controlled within a small range (between 2.5% and 4.5%) so that raw powder of two LiCa-LSX molecular sieves with mixed cations are obtained ($Li_{2.5}Ca_{46.76}$-LSX and $Li_{4.2}Ca_{45.9}$-LSX). In the present patent, LiCa-LSX molecular sieves with mixed cations containing less than 5% of $Li^+$ are prepared by a two-step mild exchange method, so that the amount of $Li^+$ used during the conventional production of molecular sieves is effectively reduced and the production cost is saved. The comparison between the LiCa-LSX molecular sieves and other Li-LSX and Ca-LSX molecular sieves with pure cations as to the adsorption for $N_2$ and $O_2$ and the heat of adsorption has proved that part of $Li^+$ cations are at exposed site SIII to participate in the adsorption for $N_2$ and $O_2$. By analog devices for oxygen production by PSA and VPSA, the oxygen yield of the LiCa-LSX molecular sieves with mixed cations and the oxygen yield of the Li-LSX and Ca-LSX molecular sieves with pure cations are compared. The analog results indicate that $Li_{4.2}Ca_{45.9}$-LSX molecular sieves obtained by replacing Ca-LSX molecular sieves with a small amount of $Li^+$ can effectively improve the yield of oxygen production by PSA.

By the above technical solutions, the present invention achieves the following beneficial effects.

1. In the present invention, since diluted LiCl solution is used during the exchange with Li+, no water washing is required during the filtration. This avoids the loss of $Li^+$ caused by the replacement of $Li^+$ with $H^+$ because of hydrolysis.

2. In the present invention, $Ca^{2+}$ in CaLSX molecular sieves is replaced with $Li^+$, instead of replacing $Li^+$ in LiLSX with $Ca^{2+}$. During the ion exchange of the X-type molecular sieves, since it is difficult to directly replace $Na^+$ in the skeleton of the molecular sieves with $Li^+$, exchanging with $Li^+$ first will result in difficulty in exchange and low utilization of $Li^+$. However, if $Na^+$ is replaced with $Ca^{2+}$ first and $Ca^{2+}$ is then replaced with $Li^+$, the amount of $Li^+$ is easily controlled because of low exchange degree of $Li^+$.

3. In the present invention, during the exchange, the exchange degree of $Li^+$ is low and the dosage of $Li^+$ is low, so that the cost is reduced. By controlling the addition amount of $Li^+$ solution and controlling the exchange degree of $Li^+$, the content of $Li^+$ in the exchange liquid is low, and the exchange degree is thus low. Since the exchange degree of the synthesized sample of the present invention is low, the desired exchange degree can be satisfied by using a small amount of $Li^+$, so that the amount of required $Li^+$ is greatly reduced because of low exchange degree.

4. In the resent invention, a minimum activation temperature suitable for full dehydration of LiLSX molecular sieves is used, so the treatment time is short. This prevents the migration of $Li^+$ to lower sites (SI, SII), and thus can adequately ensure the presence of $Li^+$ at site SIII.

DETAILED DESCRIPTION OF THE PRESENT INVENTION

The present patent will be further described below by embodiments with reference to the accompanying drawings. However, the protection scope of the present patent is not limited to the specific implementations.

Embodiment 1

1. Change of Na-LSX to Ca-LSX

Tank-type exchanges were performed in a glass beaker, each exchange lasted for 6 hours, and the temperature of the exchange solution was 25° C. The specific process was as follows.

50 g of NaLSX raw powder (dry basis) was added in 88 mL of $CaCl_2$ solution having a concentration of 1.0 M, and then stirred by a magnetic stirrer. Six times of exchange were performed, and each exchange lasted for 6 hours. The mixture was filtered by a vacuum filter flask and washed with 500 mL of deionized water, and the filter cake was dried in an oven at 25° C.

2. Exchange with Mixed Ions

Tank-type exchanges were performed in a glass beaker, each exchange lasted for 1 hour, and the temperature of the exchange solution was 25° C. The specific process was as follows.

1.5 g of the prepared CaLSX raw powder was added in each of two glass beakers, for exchange with LiCl solution having a concentration of 0.1 M. The amount of starting material of $Li^+$ in the beakers was controlled to be 0.15-0.3 times of that of $Ca^{2+}$ in the CaLSX raw powder. The mixture was magnetically stirred for 1 hour. The temperature of the exchange solution was kept at 25° C. and it was not required to adjust the pH value of the solution. The exchanged solid-liquid mixture was poured into a Buchner funnel and filtered in vacuum without washing with clean water, and the filter cake was dried for 24 hours at 25° C. The chemical compositions of the exchanged raw powder of molecular sieves with mixed cations were detected by an inductive coupling plasma optical emission spectrometer (ICP-OES). The result of detection indicates that the exchange degree of $Li^+$ is 2.5% and 4.2% (mole percentage in the dry basis), and the molecular sieves were called $Li_{2.5}Ca_{46.75}$-LSX and $Li_{4.2}Ca_{45.9}$-LSX, respectively.

3. Pre-Treatment of Samples

The samples would be dehydrated before isotherm tests. The specific operation was as follows.

In-situ degassing/dehydration was performed by a degassing and activating device equipped in a Micromeritics ASAP 3020 adsorption instrument. The two molecular sieves with mixed cations, i.e., $Li_{2.5}Ca_{46.75}$-LSX and $Li_{4.2}Ca_{45.9}$-LSX, were dehydrated for 1 hour at 350° C. The molecular sieves Li-LSX and Ca-LSX were treated for 8 hours at 375° C. and 350° C., respectively. The samples were treated at a temperature rising rate of 10° C./min, and then naturally cooled to the room temperature. The short pre-treatment lime of the mixed cations was advantageous for preventing migration of $Li^+$ to lower sites (SI, SII).

4. Adsorption Isotherm Tests and Result Analysis

The adsorption isotherm tests were conducted by the Micromeritics ASAP 3020 adsorption instrument at 25° C., 50° C., and 70° C., and at 1 atm. The test results are shown in FIGS. 2-7.

What is claimed is:

1. A method for preparing LiCa-LSX molecular sieves with mixed cations, comprising the following steps:
   step 1 of preparing CaLSX molecular sieves:
   during the preparation of CaLSX molecular sieves, replacing all $Na^+$ in NaLSX molecular sieves with $Ca^{2+}$ by multiple times of exchange with a solution containing $Ca^{2+}$ kept at room temperature, washing to remove $Ca^{2+}$ and any $Cl^-$ adhered on the surface, and drying the filter cake obtained after washing to obtain CaLSX molecular sieves;
   step 2 of changing CaLSX molecular sieves to LiCa-LSX molecular sieves by exchange with $Li^+$, with the mole percentage of $Li^+$ in the resulting LiCa-LSX molecular sieves within a range from 2% to 5%, wherein
   during the exchange with $Li^+$ to produce LiCa-LSX molecular sieves, a solution containing $Li^+$ is used; the CaLSX molecular sieves are added in the solution containing $Li^+$ in such an amount that the amount of starting material of $Li^+$ is 0.15-0.3 times of that of $Ca^{2+}$ contained in CaLSX raw powder; the exchange lasts for 0.5-2 hours, at room temperature; and an exchanged sample is directly filtered in vacuum without washing, and dried at normal temperature; and
   step 3 of activating and pre-treating the sample: heating, at a rate of 5-15° C./min, the sample which has been dried at normal temperature to a maximum temperature of 330-350° C., degassing for 0.5-3 hours, and naturally cooling to room temperature at the end of degassing, to obtain LiCa-LSX molecular sieves with mixed cations.

2. The method for preparing LiCa-LSX molecular sieves with mixed cations according to claim 1, wherein the solution containing $Li^+$ is LiCl solution.

3. The method for preparing LiCa-LSX molecular sieves with mixed cations according to claim 1, further comprising a step 4 of performing isotherm tests.

4. The method for preparing LiCa-LSX molecular sieves with mixed cations according to claim 1, wherein the NaLSX molecular sieves refer to raw powder of molecular sieves having a $SiO_2/Al_2O_3$ ratio of 2.0.

5. Applications, as selective adsorbents for $N_2$ and $O_2$, of the LiCa-LSX molecular sieves with mixed cations according to claim 1 in oxygen production processes by PSA/VPSA.

* * * * *